No. 887,316. PATENTED MAY 12, 1908.
H. L. DOHERTY.
PROCESS OF HEATING CEMENT KILNS BY PRODUCER GAS AND APPARATUS THEREFOR.
APPLICATION FILED DEC. 6, 1905.
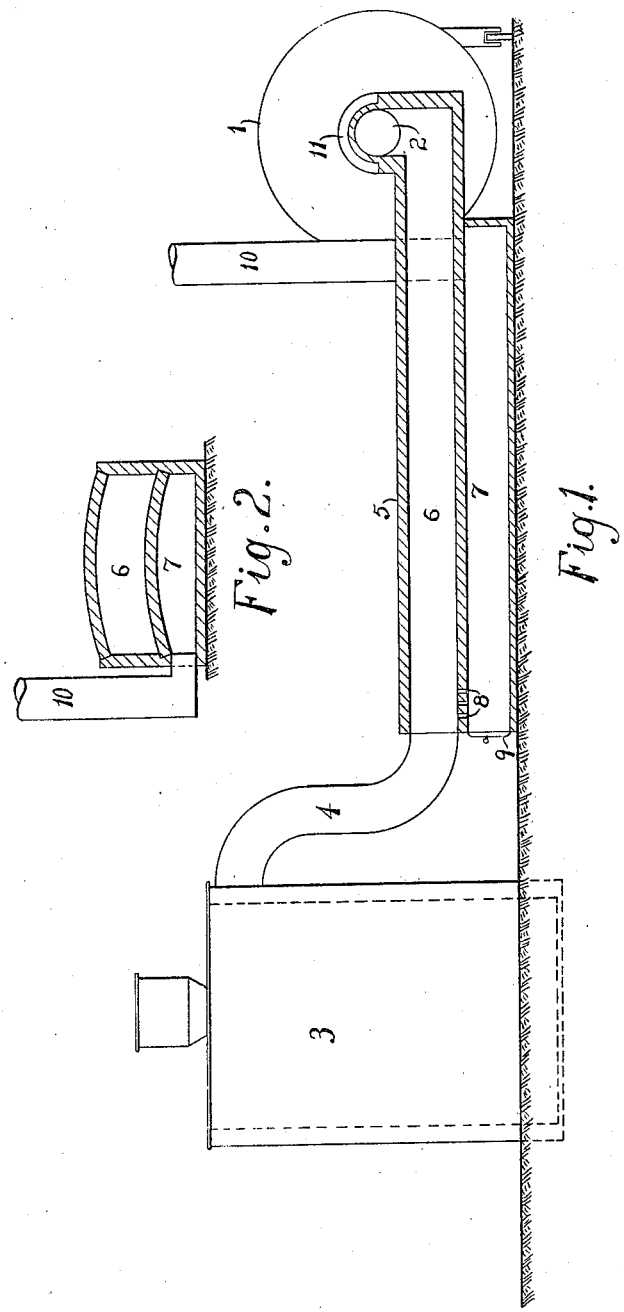
Witnesses
Inventor
Henry L. Doherty.
By his Attorney
Carleton Ellis

UNITED STATES PATENT OFFICE.

HENRY L. DOHERTY, OF MADISON, WISCONSIN, ASSIGNOR TO COMBUSTION UTILITIES COMPANY, OF NEW YORK, N. Y., A CORPORATION OF NEW YORK.

PROCESS OF HEATING CEMENT-KILNS BY PRODUCER-GAS AND APPARATUS THEREFOR.

No. 887,316.

Specification of Letters Patent.

Patented May 12, 1908.

Application filed December 6, 1905. Serial No. 290,537.

*To all whom it may concern:*

Be it known that I, HENRY L. DOHERTY, a citizen of the United States, and resident of Madison, in the county of Dane and State of Wisconsin, have invented a certain new and useful Process of Heating Cement-Kilns by Producer-Gas and Apparatus Therefor, of which the following is a specification.

This invention relates to a method of burning producer gas in its application as a heating agent to the manufacture of Portland cement in rotary kilns and to apparatus adapted therefor.

Generally speaking, producer gas has a low calorific value; a cubic foot of ordinary producer gas containing only about $\frac{1}{10}$ to $\frac{1}{8}$ the heating value of a cubic foot of methane and only about $\frac{1}{4}$ to $\frac{1}{3}$ the heating value of a cubic foot of illuminating gas. Burning in free air, a producer gas flame has a maximum temperature of perhaps 2200° F., while ordinarily it has a temperature much below that point, rarely reaching or exceeding 2000°. For this reason the numerous efforts to utilize producer gas in the burning of Portland cement, in which very high temperatures are required, has not resulted successfully in many cases. A minimum temperature of perhaps 2400° F. in the cement material is required to institute clinkering, while in practice a clinkering flame must be several hundred degrees higher, if burning in the usual type of rotary kiln, to insure this temperature in said material. Producer gas contains so large an amount of nitrogen, acting as a diluent, that the proper flame temperature for cement burning is not easily reached. No method of enriching producer gas heretofore proposed, has been sufficiently economical to permit of a practical application.

The temperature developed by a mixture of combustible gas and air depends upon the thermal value of the combustible components of the gas, on the nature of the diluent components present, on the quantity of air or other supporter of combustion employed and on the temperature of the mingling gas and air.

As producer gas cannot be enriched, practically, for cement burning, as inherently nitrogen must be present as a diluent in producer gas, and as the air supplied for combustion is susceptible of easy regulation, the remaining variables affecting the flame temperature to be considered, are the temperatures of the entering gas and air respectively.

In an application filed November 14th, 1905, bearing the Serial Number 287,217, I have shown and claimed apparatus by which the air supplied to the kiln is heated to the requisite degree of preheat for effective combustion.

The present invention concerns itself with a method of and means for preheating the gas supplied to the kiln. While especially suited for preheating producer gas, my invention may also be employed in preheating other combustible gases, particularly those of low thermal value. Blue water gas, for instance, being developed by an intermittent process, cannot be introduced into the kiln in a uniform stream or current directly from the generator; whence a gas receiver or holder intermediate the generator and the kiln is needed. Storage of the gas in this manner results in reducing its temperature practically to that of the circumambient air. The advantages of preheating gas which necessarily has been cooled before using are obvious.

My invention consists in process of preheating combustible gas to such a degree that a flame having a temperature of from 2600° F. to approximately 3000° F. is generated in the kiln. Specifically my process consists in passing the hot combustible gas taken directly from a gas producer, prior to its entry into the kiln, through a heating stove, which is maintained at a high temperature by the combustion of a portion of the gas, suitably burned in passages separate from those wherein the remainder of the gas travels; or the gas may be heated in a furnace, which is direct fired with oil, coal, coke or other fuel.

Apparatus suitable for carrying out my process is illustrated diagrammatically in the accompanying drawings, in which Figure 1 shows a gas producer; an end elevation of a cement kiln and a sectional view of a heating stove, the latter being depicted in a conventional way, so that its functions may be clearly comprehended. Fig. 2 is a cross section of said stove.

In the drawings, 1 is the end view or discharge end of a cement kiln; said kiln being of the form well known in the art, comprising an inclined barrel of considerable length with a stack at the upper end and a hood at the lower end. 2 is the inlet for the gas through said hood into the kiln.

3 diagrammatically illustrates a gas producer.

4 is an outlet pipe or conduit for conveying the gas to a stove 5. The latter is constructed with a flue 6 in its upper part, through which the gas travels and is heated, and the combustion chamber 7 in its lower part, in which the fuel employed is burned.

At 8 is shown a number of ports through which gas may discharge into the combustion chamber 7. Air is admitted through the door or chamber 9.

10 is the stack connected to said combustion chamber, whereby the products of combustion are removed from the chamber 7, after having performed useful work in heating the producer gas in the flue 6.

In operating this apparatus, it is necessary after having put the gas producer into proper condition for gasification, to build a wood fire in the kiln 1 and in the chamber 7. Gas is then passed through the flue 6 and into the kiln through port 2. Air is admitted through the horseshoe shaped port 11, and the mixture of gas and air, ignited by the wood fire in the kiln, burns with a long flame of low temperature characteristic of ordinary producer gas. The ports 8 are thereupon opened, air being admitted through the door 9, whereby the chamber 7 becomes filled with flame, thereby heating the walls of the flue 6 to a marked degree. The gas passing through the flue 6 being heated to a temperature higher than its initial temperature, commences to burn in the kiln with a bright and clear flame. As the walls of the flue 6 grow hotter, the gas passing therethrough increases in temperature, until finally it will be observed that the flame in the kiln 1 has acquired a temperature of from 2600° F. to 3000° F. By admitting heated instead of cold air through the port 11, the temperature of the flame is augmented.

The gas producer 3 may be operated either by a blast of air and steam in the customary way, or better by a draft current of air and products of combustion. Steam is costly to generate and as its dissociation in the producer fire is incomplete, there is considerable loss in efficiency from the injection of steam into a producer in the quantity sufficient to prevent clinker. On the contrary products of combustion such as those obtained from the stack of the kiln after combustion has become substantially complete, are free from the objectionable features of steam, and afford a uniform gas, without the production of clinker or slag in the producer.

The use of steam in a producer gives rise to hydrogen in the gas, the presence of which seemingly decreases the content of inert nitrogen; but my observations show me that hydrogen is not as suitable for the production of high temperature as is carbon monoxid. This is probably due to dissociation phenomena at high temperatures, which tend to prevent the perfect combination of hydrogen and oxygen. While it is true that carbon dioxid dissociates at high temperatures, and its degree of dissociation is dependent on its concentration, yet it is improbable that its dissociation proceeds to anything like the degree that water vapor does, under the same conditions. Because of the necessity of attaining a very high temperature in the clinkering zone of the kiln it follows that the operation must be such as to favor any conditions tending to increase the temperature; hence the importance which I place upon the operation of the gas producer with products of combustion. The products of combustion employed may be obtained from any suitable source, although preferably from the kiln itself, owing to the large amount of carbon dioxid present in the kiln gases. I prefer to use these products of combustion at the highest possible temperature compatible with general ease of operation.

The heating stove 5 has been illustrated in a purely conventional way, but it must be understood that it may be constructed in any suitable manner, with any number of flues, either horizontally placed or otherwise, of such design that the gas is quickly and efficiently preheated. Care should be taken in the design of such a stove to have the passages so arranged as to permit of their being readily cleaned, and furthermore of such size that the stove may be run for a considerable period of time without trouble arising from clogging due to the deposition of the soot.

My invention permits of the attainment of the high temperatures demanded for the rapid production of cement, without the difficulties experienced with such fuel as powdered coal.

I claim:

1. The process of heating rotary cement kilns which consists in generating producer gas, passing the hot gas directly from the producer through a passage having walls of heat conducting material, heating said walls by combustion therearound to an extent sufficient to cause the gas passing through said passage to burn with a flame having a temperature in excess of 2600° Fahrenheit, and burning the so-heated gas in a rotary cement kiln in proximity to cement material advancing therethrough.

2. The process of heating cement kilns which consists in generating producer gas, heating a portion of said gas by burning the residue around the conduit through which said portion travels; removing the products of combustion of said residue and finally burning the heated portion in a cement kiln.

3. The process of heating rotary cement kilns which consists in generating producer gas substantially free of hydrogen, passing the hot gas directly from the gas produce through a passage having walls of heat conducting material, fire-heating said walls to an extent sufficient to cause the gas passing therepast to burn with a flame having a temperature in excess of 2600° Fahrenheit, and burning the so-heated gas in a rotary cement kiln in proximity to cement material passing therethrough.

4. The process of heating cement kilns which consists in generating dry producer gas, heating a portion of said gas by burning the residue around the conduit through which said portion travels, removing the products of combustion of said residue and finally burning the heated portion in a cement kiln.

5. The process of heating rotary cement kilns which consists in generating producer gas, superheating the same by direct combustion around a heat-conductive conduit containing the same, said superheating being sufficiently intense to enable it to burn with a flame temperature in excess of 2600° Fahrenheit, passing the superheated gas into a rotary cement kiln in the form of a jet and there burning it in proximity to cement material advancing therethrough by means of a jet of relatively colder air introduced above and partly enveloping said jet of superheated gas.

6. A cement making apparatus comprising a gas producer, a gas fired rotary cement kiln, a directly connecting gas conduit between producer and the burning means of the cement kiln, said conduit having walls of heat conducting material, and means for burning fuel around the conduit and in proximity to said walls.

7. A cement making apparatus comprising a gas producer, a gas fired kiln, a gas conduit transmitting a portion of the producer gas to the burning means in the kiln, means for burning the residue of the gas around said conduit to heat the portion of gas passing therethrough, and means for removing the products of combustion of said residue.

8. A cement making apparatus comprising a gas producer, a rotary cement kiln provided with gas burning means, said means comprising a jet inlet for gas and an arched air inlet communicating with a source of air under pressure and arranged immediately above said gas inlet, and a conduit having walls of heat-conducting material directly connecting the producer and the gas inlet of the kiln, said conduit being provided with fire heating means externally of the same, whereby the hot gas coming from the producer may be superheated.

Signed at New York city in the county of New York and State of New York this 28th day of November, A. D. 1905.

HENRY L. DOHERTY.

Witnesses:
FLETCHER P. SCOFIELD,
J. CHAS. ANDREWS.